US011350338B2

(12) United States Patent
Kamei et al.

(10) Patent No.: US 11,350,338 B2
(45) Date of Patent: May 31, 2022

(54) INFORMATION PROCESSING APPARATUS, COMMUNICATION METHOD, COMMUNICATION PROGRAM, COMMUNICATION SYSTEM, IOT DEVICE, AND BASE STATION

(71) Applicant: NEC Corporation, Tokyo (JP)

(72) Inventors: Akira Kamei, Tokyo (JP); Toru Yamada, Tokyo (JP); Masahiro Serizawa, Tokyo (JP); Kyoji Hirata, Tokyo (JP); Yumiko Okuyama, Tokyo (JP); Satoshi Hasegawa, Tokyo (JP); Masashi Shimoma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/335,582

(22) PCT Filed: Sep. 21, 2017

(86) PCT No.: PCT/JP2017/034178
§ 371 (c)(1),
(2) Date: Mar. 21, 2019

(87) PCT Pub. No.: WO2018/056387
PCT Pub. Date: Mar. 29, 2018

(65) Prior Publication Data
US 2020/0022059 A1 Jan. 16, 2020

(30) Foreign Application Priority Data
Sep. 23, 2016 (JP) .............................. JP2016-186225

(51) Int. Cl.
*H04W 40/22* (2009.01)
*H04L 45/122* (2022.01)
(Continued)

(52) U.S. Cl.
CPC .......... *H04W 40/22* (2013.01); *H04L 45/122* (2013.01); *H04L 67/12* (2013.01); *H04W 40/10* (2013.01); *H04W 40/12* (2013.01); *H04W 88/04* (2013.01)

(58) Field of Classification Search
CPC ...... H04L 45/122; H04L 67/12; H04W 40/10; H04W 40/12; H04W 40/22; H04W 84/22; H04W 88/04; H04W 92/18
See application file for complete search history.

(56) References Cited

U.S. PATENT DOCUMENTS 9,717,110 B1 * 7/2017 Gupta ..................... H04H 20/38
2006/0083243 A1 4/2006 Igarashi et al.
(Continued)

FOREIGN PATENT DOCUMENTS

JP 2006-115354 A 4/2006
JP 2006-157637 A 6/2006
(Continued)

OTHER PUBLICATIONS

International Search Report corresponding to PCT/JP2017/034178, dated Dec. 19, 2017 (5 pages).
(Continued)

*Primary Examiner* — Saad A. Waqas
(74) *Attorney, Agent, or Firm* — Sughrue Mion, PLLC (57) ABSTRACT

An information processing apparatus that suppresses a power consumption problem in a relay terminal includes a first controller that controls an IoT device to perform multihop routing via at least one relay on an upload of data from the IoT device to a base station, and a second controller that controls the base station to use, on a down-link from the base station to the IoT device, a route different from a route that uses at least one relay.

3 Claims, 10 Drawing Sheets

(51) Int. Cl.
  *H04L 67/12* (2022.01)
  *H04W 40/10* (2009.01)
  *H04W 40/12* (2009.01)
  *H04W 88/04* (2009.01)

(56) References Cited

U.S. PATENT DOCUMENTS

| | | | |
|---|---|---|---|
| 2014/0086141 A1 | 3/2014 | Morioka | |
| 2014/0204835 A1* | 7/2014 | Speight | H04W 72/04 370/315 |
| 2016/0269486 A1* | 9/2016 | Gupta | H04W 72/0446 |

FOREIGN PATENT DOCUMENTS

| | | |
|---|---|---|
| JP | 2010-233072 A | 10/2010 |
| JP | 2013-135313 A | 7/2013 |
| JP | 2014-120960 A | 6/2014 |
| JP | 2014-519785 A | 8/2014 |
| WO | WO-2013/136527 A1 | 9/2013 |
| WO | WO-2015/094691 A1 | 6/2015 |

OTHER PUBLICATIONS

Fujitsu, Consideration on the Enhancement of UE-to-Network Relay, 3GPP TSG-RAN WG2 Meeting#93bis, R2-162240, Apr. 15, 2016, pp. 1-3.

Coolpad, Discussion on UE-to-NW Relay Architecture Enhancements, 3GPP TSG-RAN WG2#93bis, R2-162354, Apr. 15, 2016, pp. 1-4.

Coolpad, Discussion on Architecture Issues for ProSe UE-to-NW Relay in Release 14, 3GPP TSG-RAN WG2#95, R2-165130, Aug. 26, 2016, pp. 1-4.

Qualcomm, Inc., Scenarios for FeD2D, 3GPP TSG-RAN WG2#93bis, R2-162741, Apr. 15, 2016, (5 pages).

ZTE, Considerations on the Working Scope of R14 feD2D, 3GPP TSG-RAN WG2#93bis, R2-162402, Apr. 15, 2016, (5 pages).

3GPP TR 23.703 V12.0.0 (Feb. 2014), 3rd Generation Partnership Project; Technical Specification Group Services and System Aspects; Study on Architecture Enhancements to Support Proximity-based Services (ProSe) (Release 12) (324 pages).

Japanese Decision of Refusal issued in Japanese Patent Application No. 2018-540308, dated Jul. 14, 2020, 5 pages.

\* cited by examiner

INFORMATION PROCESSING APPARATUS, COMMUNICATION METHOD, COMMUNICATION PROGRAM, COMMUNICATION SYSTEM, IOT DEVICE, AND BASE STATION

CROSS REFERENCE TO RELATED APPLICATIONS

This application is a national stage application of International Application No. PCT/JP2017/034178 entitled "INFORMATION PROCESSING APPARATUS, COMMUNICATION METHOD, COMMUNICATION PROGRAM, COMMUNICATION SYSTEM, IoT DEVICE, AND BASE STATION" (filed Sep. 21, 2017) which claims the benefit of the priority of Japanese Patent Application No. 2016-186225 (filed on Sep. 23, 2016). The disclosures of both applications are hereby incorporated by reference in their entirety.

TECHNICAL FIELD

The present invention relates to an information processing apparatus, a communication method, a communication program, a communication system, an IoT device, and a base station.

BACKGROUND ART

As one form of ProSe (Proximity Service), FIG. 6.3.11.1-3 in non-patent literature 1 discloses a form in which many IoT (Internet of Things) devices and a base station communicate with each other via relays.

Patent literature 1 and patent literature 2 disclose forms in which a gateway apparatus, a UE-Relay terminal, or the like is inserted between an IoT device and a base station, and an access from the IoT device is temporarily terminated and then connected to a network. Further, multihop communication is described in which data is relayed by a plurality of relays and transmitted for the purpose of power saving of an IoT device and data transmission in a low-bit-rate region.

CITATION LIST

Patent Literature

Patent literature 1: Japanese Patent Laid-Open No. 2006-157637
Patent literature 2: Japanese Patent Laid-Open No. 2010-233072

Non-Patent Literature

Non-patent literature 1: 3GPP TR 23.703 V12.0.0 (2014-02)

SUMMARY OF THE INVENTION

Technical Problem

In the multihop communication described in the above literature, however, data communication from an IoT device (upload when viewed from the IoT device) and a triggering request to the IoT device (down-link when viewed from the IoT device) are performed using the same relay. This causes a power consumption problem in the relay.

The present invention enables to provide a technique of solving the above-described problem.

Solution to Problem

One example aspect of the present invention provides an information processing apparatus comprising:
a first controller that controls an IoT device to perform multihop routing via at least one relay on an upload of data from the IoT device to a base station; and
a second controller that controls the base station to use, on a down-link from the base station to the IoT device, a route different from a route that uses the at least one relay.

Another example aspect of the present invention provides a communication method comprising:
performing multihop routing via at least one relay on an upload of data from an IoT device to a base station; and
using, on a down-link from the base station to the IoT device, a route different from a route that uses the at least one relay utilized in the upload.

Still other example aspect of the present invention provides a communication program for causing a computer to execute a method, comprising:
performing multihop routing via at least one relay on an upload of data from an IoT device to a base station; and
using, on a down-link from the base station to the IoT device, a route different from a route that uses the at least one relay utilized in the upload.

Still other example aspect of the present invention provides a communication system comprising:
an IoT device including a first controller that controls to perform multihop routing via at least one relay on an upload of data from the IoT device to a base station; and
a base station including a second controller that controls to use, on a down-link from the base station to the IoT device, a route different from a route that uses the at least one relay.

Still other example aspect of the present invention provides an IoT device comprising a controller that controls to perform multihop routing via at least one relay on an upload of data to a base station.

Still other example aspect of the present invention provides a base station comprising a second controller that controls to use, on a down-link to an IoT device, a route different from an up-link from the IoT device to the base station.

Advantageous Effects of Invention

According to the present invention, a power consumption problem in a relay terminal can be suppressed.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

Figure 1:
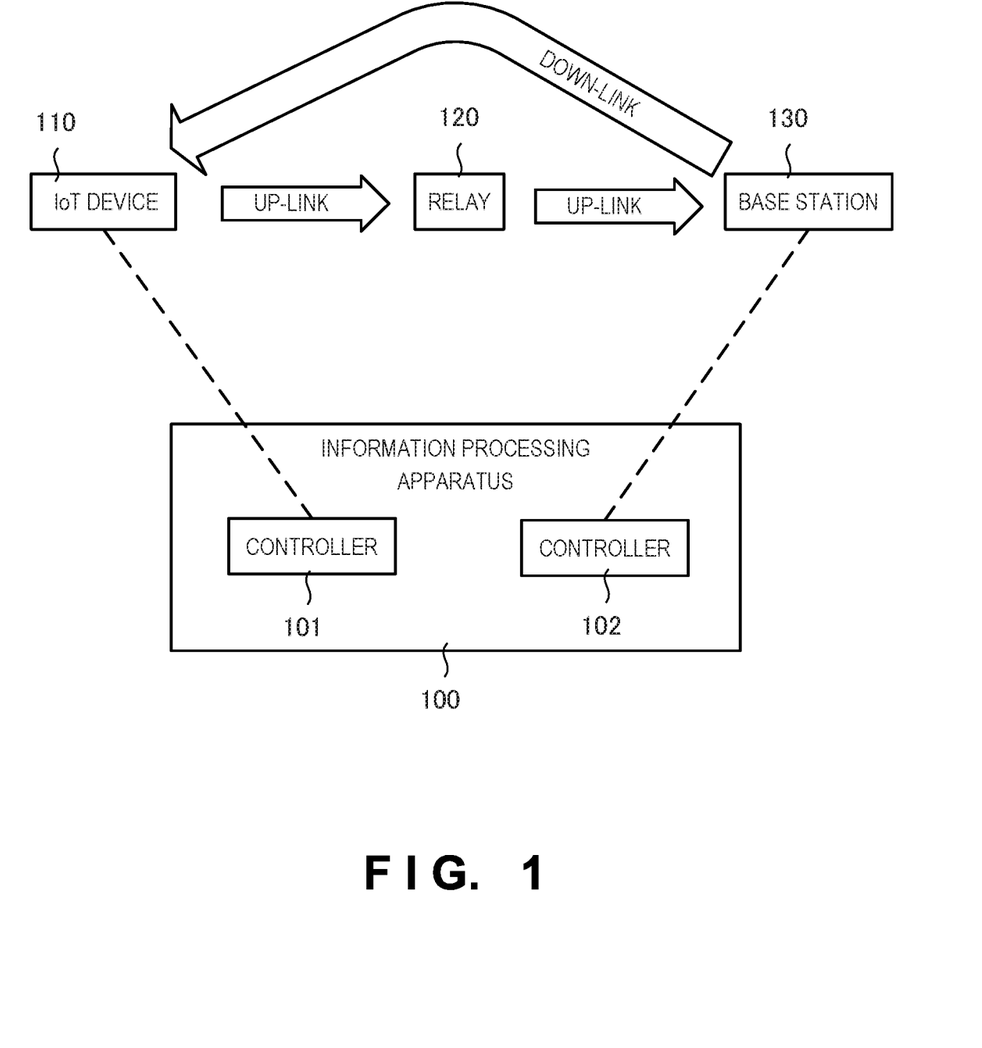
FIG. 1 is a view for explaining the arrangement of an information processing apparatus according to the first example embodiment of the present invention.

An information processing apparatus 100 according to the first example embodiment of the present invention will be described with reference to FIG. 1. The information processing apparatus 100 is an apparatus that controls communication between an IoT device and a base station. As shown in FIG. 1, the information processing apparatus 100 includes controllers 101 and 102 and controls an IoT device 110 and a base station 130. Here, the "IoT device" is a concept including all devices connectable to the Internet, varying from a simple sensor to an information processing terminal (mobile terminal).

The controller 101 controls the IoT device 110 to perform multihop routing via at least one relay 120 on an upload of data from the IoT device 110 to the base station 130. This relay may be an information processing terminal (mobile terminal).

On a down-link from the base station 130 to the IoT device 110, the controller 102 controls the base station 130 to use a route different from a route that uses at least one relay 120.

This can suppress a consumption power problem in the relay 120.

Second Example Embodiment

Figure 2:
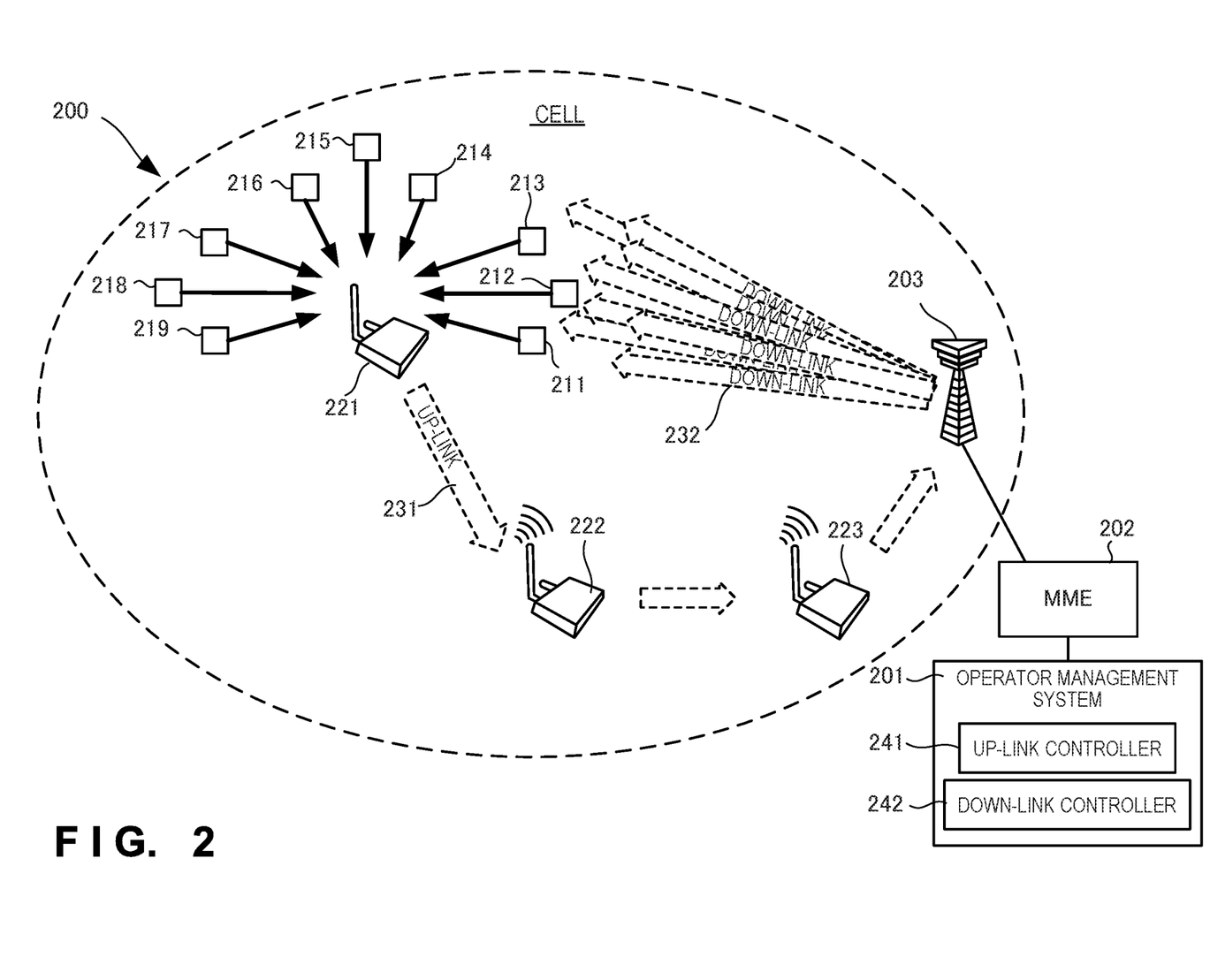
FIG. 2 is a block diagram showing the arrangement of a communication system according to the second example embodiment of the present invention.

A communication system 200 according to the second example embodiment of the present invention will be described with reference to FIGS. 2 to 4. FIG. 2 is a view for explaining the overall arrangement of the communication system 200 according to this example embodiment.

An operator management system 201 in FIG. 2 includes an up-link controller 241 and a down-link controller 242. The operator management system 201 controls an up-link and a down-link to a base station (eNB: evolved Node B) 203 and devices 211 to 219 via an MME (Mobility Management Entity) 202.

The up-link controller 241 controls the IoT devices 211 to 219 to perform multihop routing via at least one of relays 221 to 223 on an uplink 231 of data from the IoT devices 211 to 219 to the base station 203.

The down-link controller 242 controls the base station 203 to use a route smaller in the number of relays than a route used at the time of upload on a down-link 232 from the base station 203 to the IoT devices 211 to 219. In this case, the base station 203 is controlled to use the down-link 232 of a direct route in which the number of relays is minimized.

Figure 3:
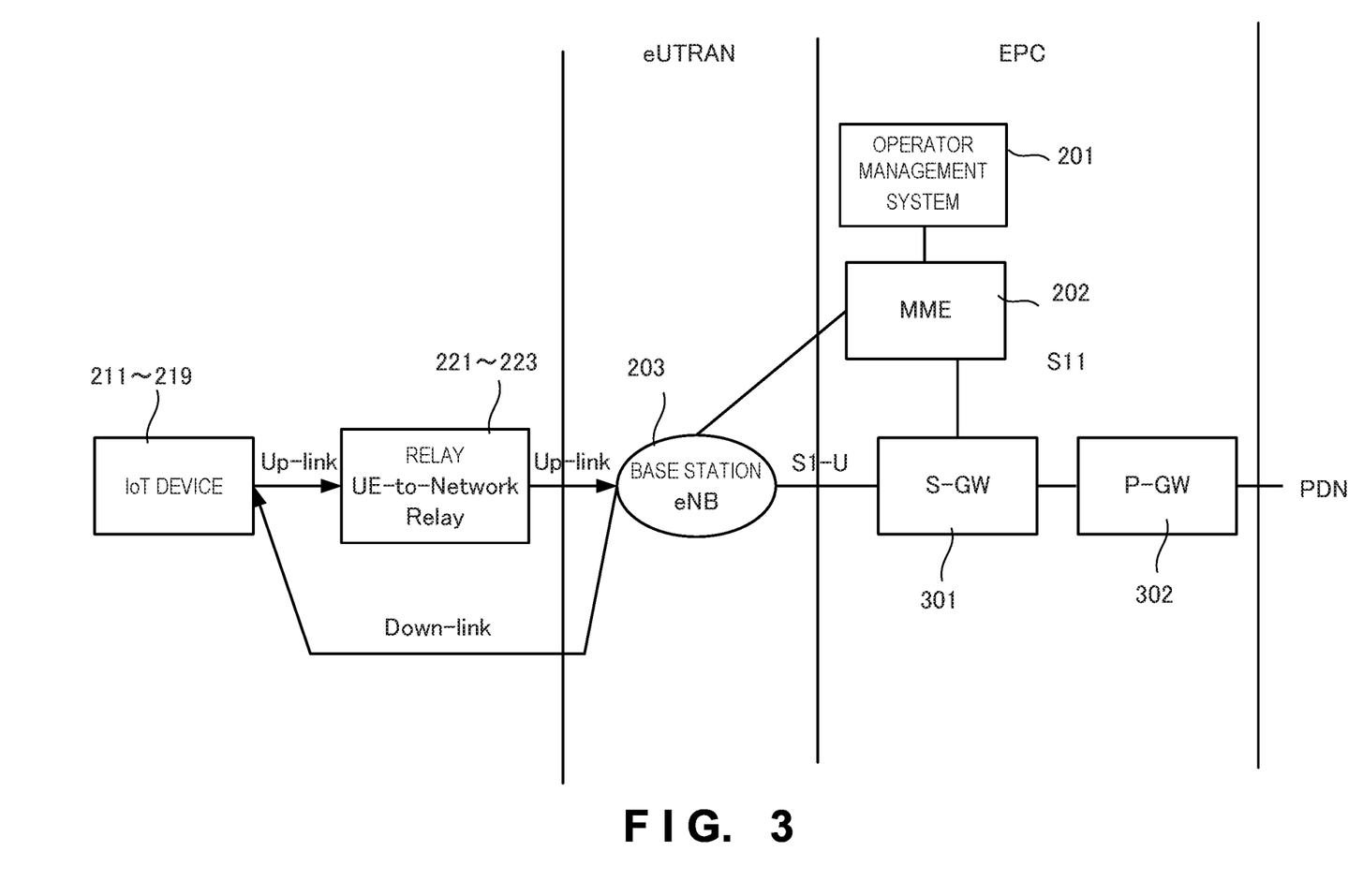
FIG. 3 is a block diagram showing the arrangement of the communication system according to the second example embodiment of the present invention.

FIG. 3 is a block diagram schematically showing the arrangement of the communication system 200. An overall EPC (Evolved Packet Core) is constituted by an S-GW (Serving Gateway) 301 and a P-GW (Packet Gateway) 302 in addition to the operator management system 201 and the MME 202. The EPC functions as a core network capable of accommodating various wireless accesses including LTE (Long Term Evolution).

The MME 202 performs control of the base station 203, position registration control of devices, smartphones, and the like, authentication (security control), handover control, and the like. Further, the MME 202 has charge of setting processing of a user data transfer path between the S-GW (Serving Gateway) 301 and the base station 203, and a control signal. The MME 202 has an interface with an HSS (Home Subscriber Server) (not shown) and manages visited users.

The S-GW (Serving Gateway) 301 is an apparatus that accommodates 3GPP (Third Generation Partnership Project) wireless such as LTE and 3G wireless and transmits user data. The S-GW (Serving Gateway) 301 is also a point at which the user data transfer path to LTE and the 3G wireless access accommodation network is switched.

The P-GW (Packet Gateway) 302 serves as a node with a packet network (PDN: Packet Data Network) other than a core network, such as i-Mode® or IMS (IP Multimedia Subsystem). This apparatus is a gateway apparatus that performs assignment of IP addresses and the like and accommodates 3GPP accesses and non-3GPP accesses.

The operator management system 201 switches the path between upload and download between the devices 211 to 219 and the base station 203 based on predetermined conditions when performing multihop communication. When uploading data from the devices 211 to 219, multihop communication is performed to relay data by at least one of the relays 221 to 223 and transmit them to the base station 203. Data from the base station 203 (for example, a triggering request or update of firmware) is directly transmitted to the devices 211 to 219 without performing multihop communication.

Figure 4:
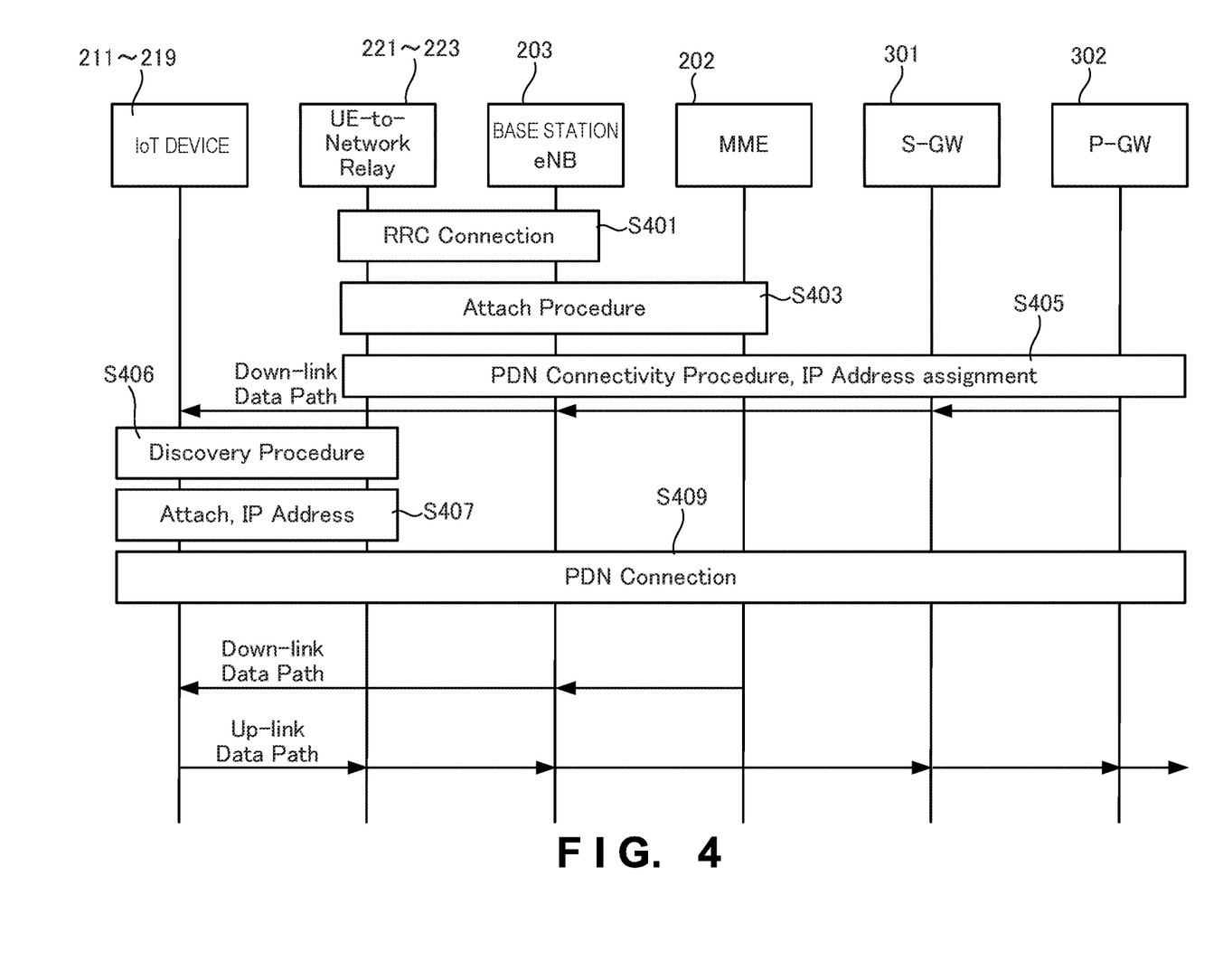
FIG. 4 is a sequence chart for explaining a sequence of processing in the communication system according to the second example embodiment of the present invention.

FIG. 4 is a sequence chart showing exchange of signals between the building components shown in FIG. 3. First, RRC (Radio Resource Control) connection is performed between the relays 221 to 223 and the base station 203 (S401).

Then, Attach Procedure is performed to connect the relays 221 to 223 to the MME 202 (S403).

Further, the relays 221 to 223 perform PDN Connectivity Procedure and IP Address assignment to implement a connection to a packet network (PDN) other than the core network (S405).

The IoT devices 211 to 219 perform Discovery Procedure to search for the relays 221 to 223. D2D (Device to Device) Attach Procedure and IP Address assignment are performed between the IoT devices 211 to 219 and the closest relay among the discovered relays 221 to 223 (S407).

By these processes, a connection from the devices 211 to 219 to the PDN is established (S409).

After that, the base station 203 transmits a triggering request directly to the IoT devices 211 to 219 in accordance with an instruction from the operator management system 201 via the MME 202 (S411).

The IoT devices 211 to 219 upload data to the base station 203 via the relays 221 to 223 in accordance with an instruction from the operator management system 201 via the MME 202.

As described above, according to this example embodiment, data is directly exchanged between the base station and a device without using a relay on an up-link, so the consumption power in the relay can be suppressed. At the time of download, the device transmits data to the base station via the relay, the transmission distance of data from the device can be shortened, and the consumption power of the device can be reduced.

That is, the number of relay terminals that relay data at the time of download can be decreased and the consumption power can be suppressed. Further, signaling to be exchanged can be minimized and control data can be reduced.

Third Example Embodiment

Figure 5:
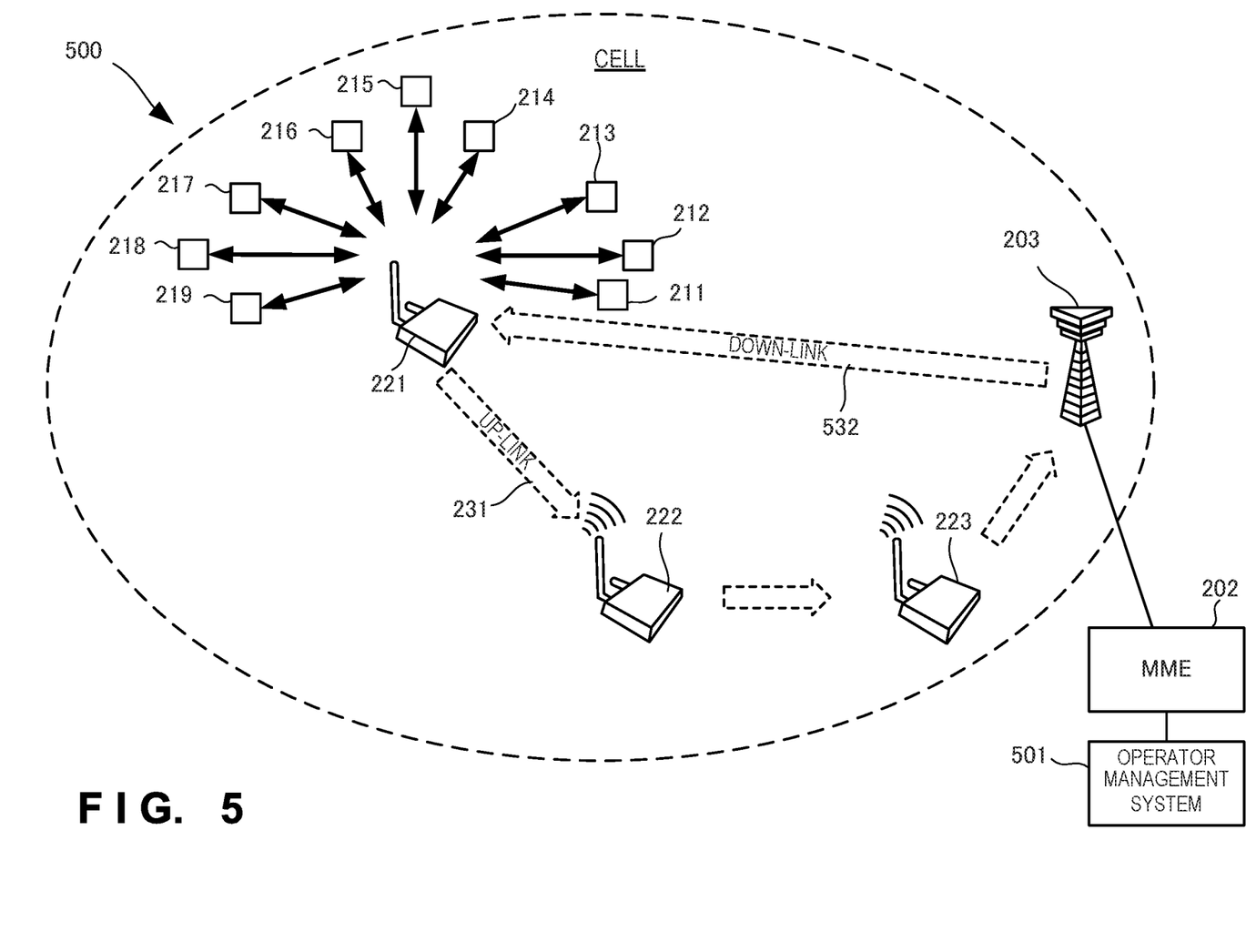
FIG. 5 is a block diagram showing the arrangement of a communication system according to the third example embodiment of the present invention.

A communication system 500 according to the third example embodiment of the present invention will be described with reference to FIG. 5. FIG. 5 is a view for explaining the overall arrangement of the communication system 500. The communication system 500 according to this example embodiment is different from that according to the second example embodiment in that an operator management system 501 transmits a triggering request from a base station 203 to devices 211 to 219 via a relay 221 on a down-link 532. Since the remaining arrangement and operation are the same as those in the second example embodiment, the same reference numerals denote the same arrangement and operation and a detailed description thereof will not be repeated.

According to this example embodiment, the consumption power in relays 222 and 223 can be suppressed without direct download to the devices 211 to 219.

Fourth Example Embodiment

Figure 6:
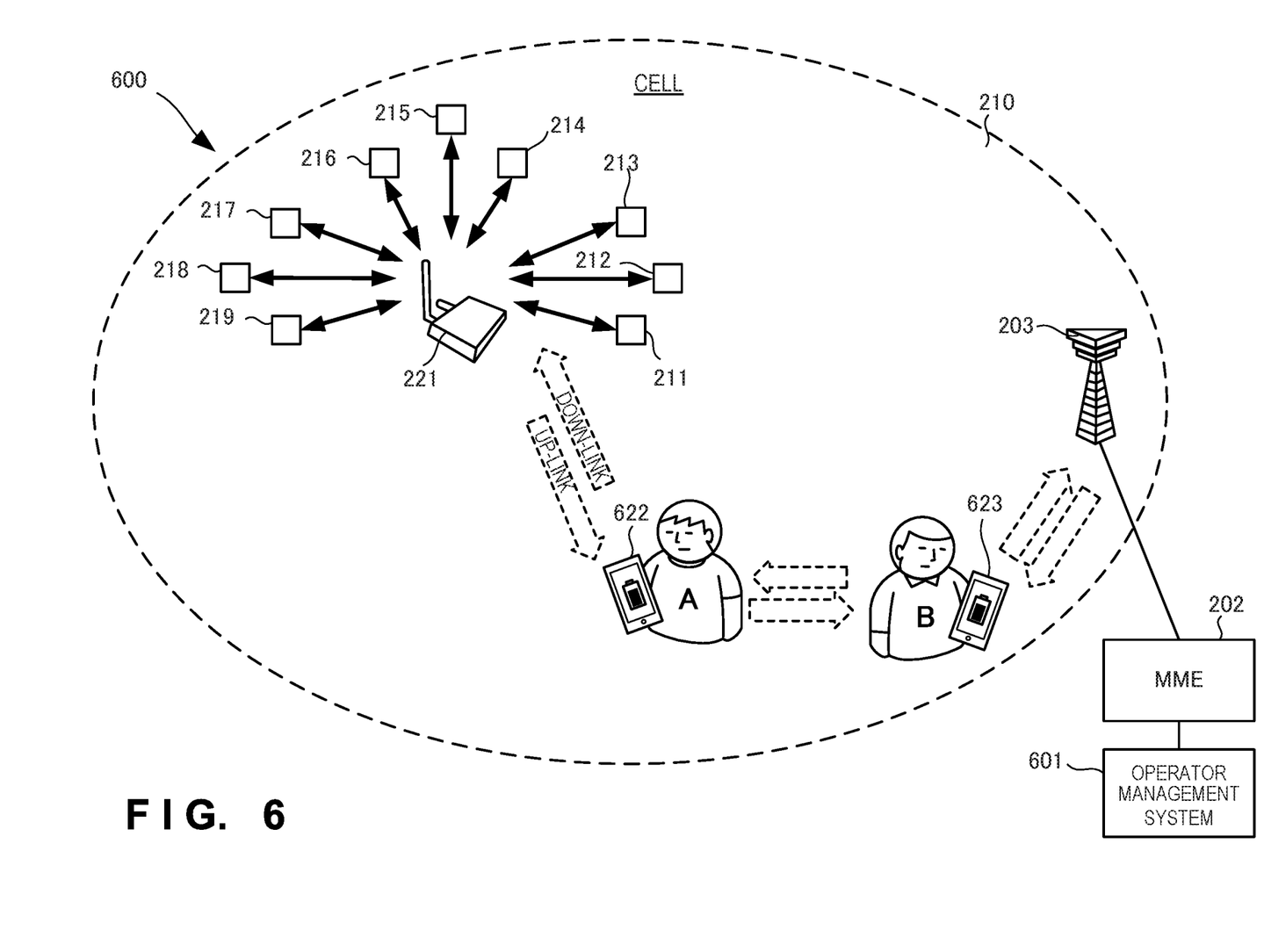
FIG. 6 is a block diagram showing the arrangement of a communication system according to the fourth example embodiment of the present invention.
Figure 7:
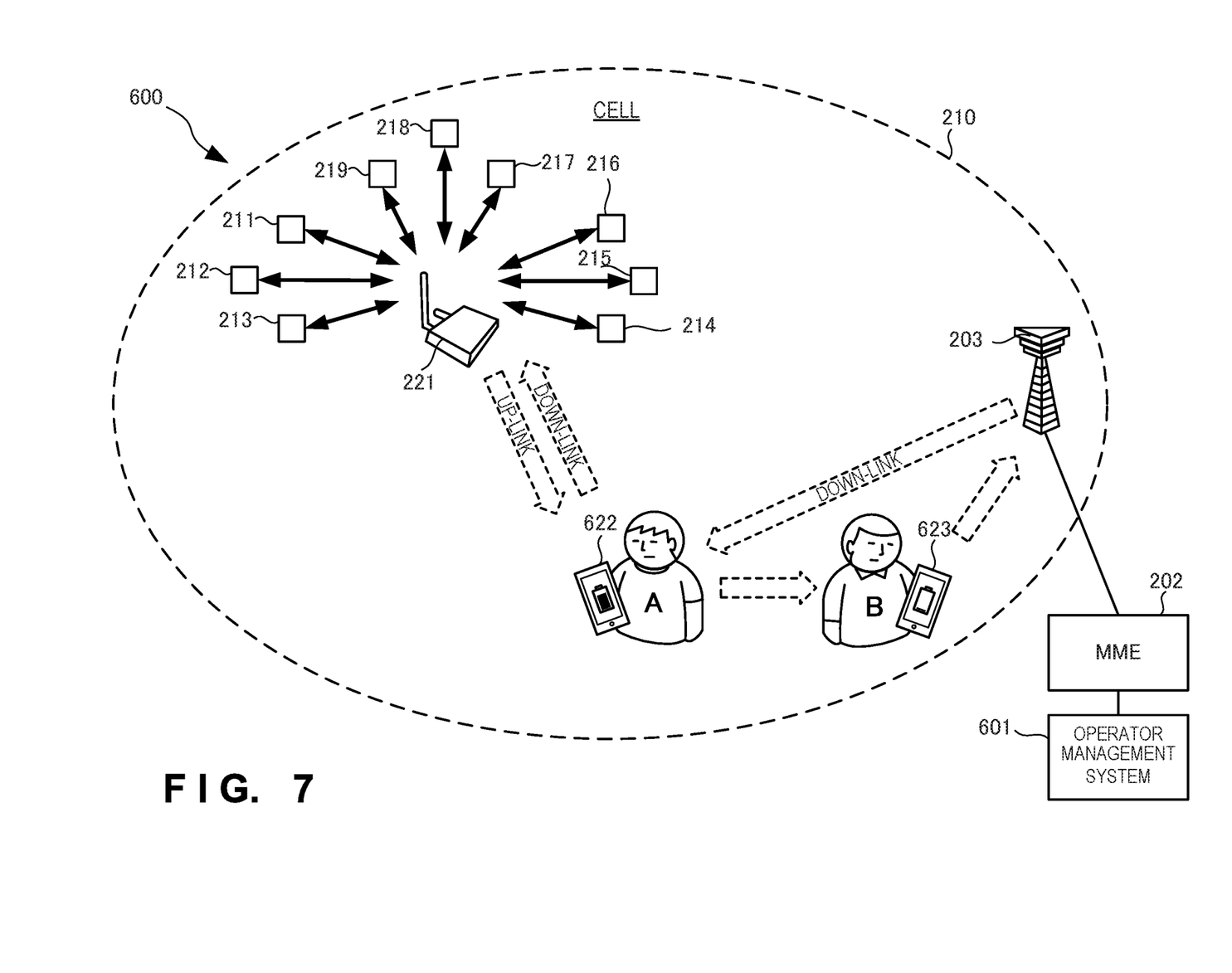
FIG. 7 is a block diagram showing the arrangement of the communication system according to the fourth example embodiment of the present invention.

A communication system 600 according to the fourth example embodiment of the present invention will be described below with reference to FIGS. 6 to 8. FIGS. 6 and 7 are views for explaining the overall arrangement of the communication system 600. The communication system 600 according to this example embodiment is different from that according to the third example embodiment in that an operator management system 601 changes the route of a down-link in accordance with the remaining battery level of a relay. Since the remaining arrangement and operation are the same as those in the third example embodiment, the same reference numerals denote the same arrangement and operation and a detailed description thereof will not be repeated.

As shown in FIG. 7, when the remaining battery level of a relay 623 lowers, a base station 203 transmits a triggering request to devices 211 to 219 via relays 221 and 622.

Figure 8:
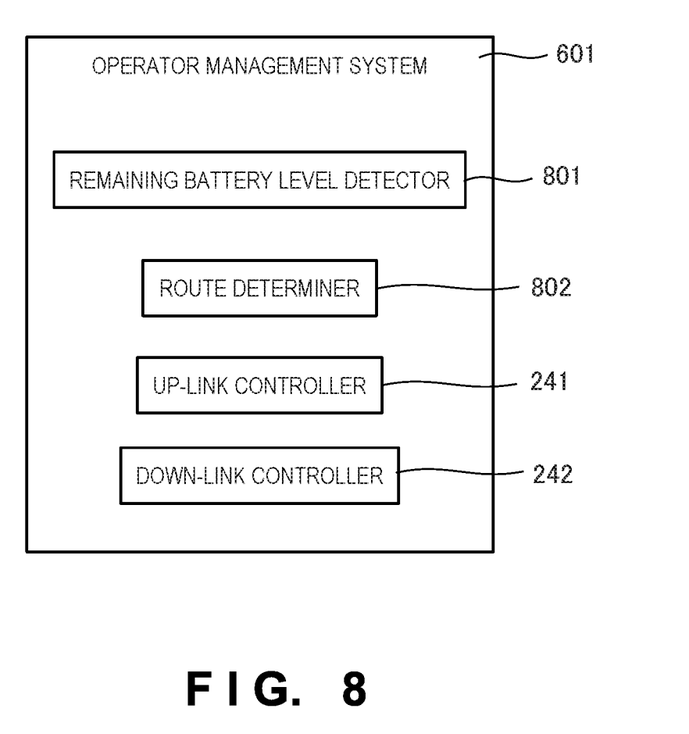
FIG. 8 is a block diagram showing the arrangement of an operator management system according to the fourth example embodiment of the present invention.

FIG. 8 is a block diagram showing the functional arrangement of the operator management system 601. As shown in FIG. 8, the operator management system 601 includes a remaining battery level detector 801 and a route determiner 802 in addition to an up-link controller 241 and a down-link controller 242.

The remaining battery level detector 801 detects the remaining battery level of each relay. The route determiner 802 excludes relays with low remaining battery levels based on the result of detection by the remaining battery level detector 801, determines the route of a down-link, and sends it to the down-link controller 242. The down-link controller 242 controls the base station 202 to form a down-link using the route determined by the route determiner 802. Note that a power-receiving relay may be preferentially passed.

According to this example embodiment, a relay is selected in accordance with the remaining battery level, so the battery consumption problem of the relay caused by a down-link can be solved.

Fifth Example Embodiment

Figure 9:
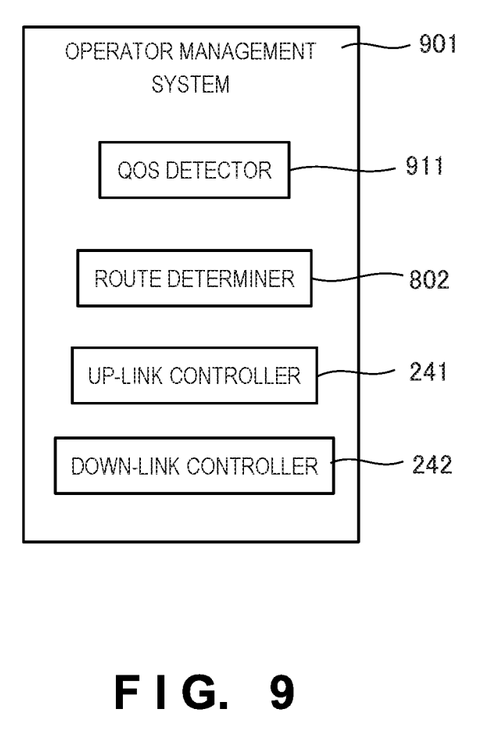
FIG. 9 is a block diagram showing the arrangement of an operator management system according to the fifth example embodiment of the present invention.

A communication system according to the fifth example embodiment of the present invention will be described below with reference to FIG. 9. FIG. 9 is a view for explaining the internal arrangement of an operator management system 901 in the communication system according to this example embodiment. The communication system according to this example embodiment is different from that according to the fourth example embodiment in that the operator management system 901 changes the route of a down-link in accordance with the QOS (Quality Of Signal) of a relay. Since the remaining arrangement and operation are the same as those in the fourth example embodiment, the same reference numerals denote the same arrangement and operation and a detailed description thereof will not be repeated.

As shown in FIG. 9, the operator management system 901 includes a QOS detector 911 in addition to an up-link controller 241, a down-link controller 242, and a route determiner 802.

The QOS detector 911 detects the QOS of each relay. The route determiner 802 excludes relays with poor QOSs based on the result of detection by the QOS detector 911, determines the route of a down-link, and sends it to the down-link controller 242. The down-link controller 242 controls a base station 203 to form a down-link using the route determined by the route determiner 802.

According to this example embodiment, a relay is selected in accordance with the QOS, so the QOS problem of the relay on a down-link can be solved.

Sixth Example Embodiment

Figure 10:
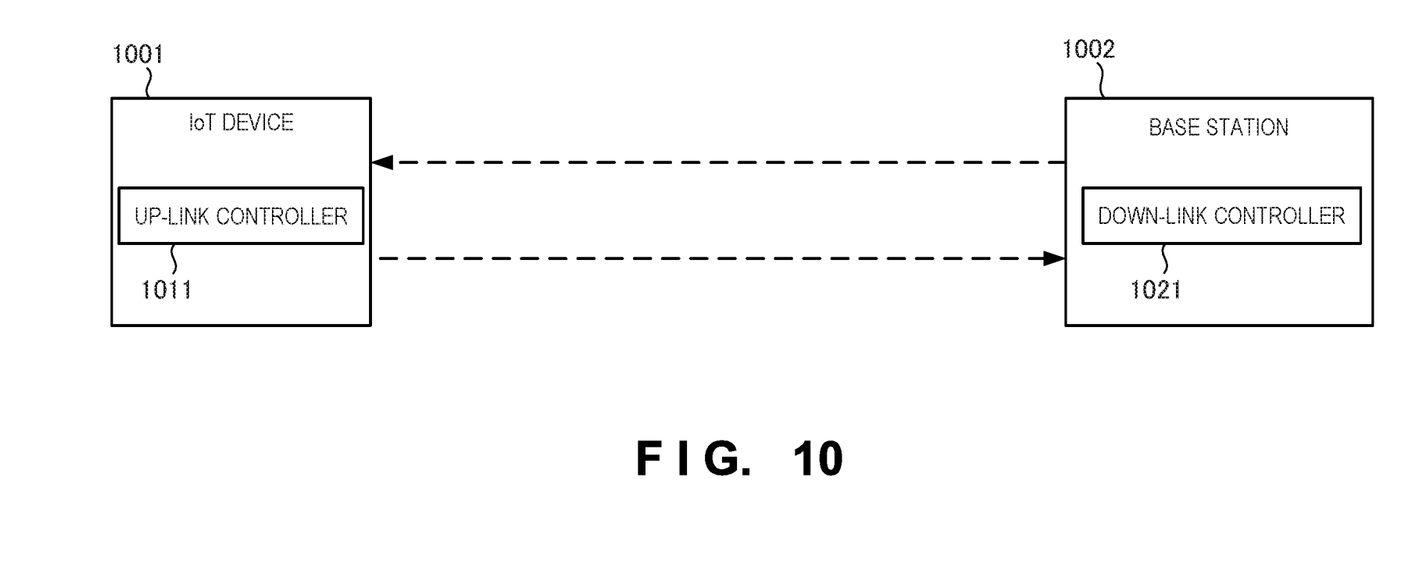
FIG. 10 is a block diagram showing the arrangement of a communication system according to the sixth example embodiment of the present invention.

A communication system according to the sixth example embodiment of the present invention will be described below with reference to FIG. 10. FIG. 10 is a view for explaining an outline of the communication system according to this example embodiment. The communication system according to this example embodiment is different from that according to the second example embodiment in that an IoT device 1001 includes an up-link controller 1011 and a base station 1002 includes a down-link controller 1021. Since the remaining arrangement and operation are the same as those in the fourth example embodiment, the same reference numerals denote the same arrangement and operation and a detailed description thereof will not be repeated.

The up-link controller 1011 controls to perform multihop routing via at least one relay on an upload of data from the IoT device 1001 to the base station 1002.

On a down-link from the base station 1002 to the IoT device 1001, the down-link controller 1021 controls to use a route different the route of an up-link using at least one relay.

According to this example embodiment, the consumption power of the overall system can be suppressed.

Other Example Embodiments

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of the example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

Other Expressions of Example Embodiments

Some or all of the above-described example embodiments can also be described as in the following supplementary notes but are not limited to the followings.

(Supplementary Note 1)
There is provided an information processing apparatus comprising:
a first controller that controls an IoT device to perform multihop routing via at least one relay on an upload of data from the IoT device to a base station; and
a second controller that controls the base station to use, on a down-link from the base station to the IoT device, a route different from a route that uses the at least one relay.

(Supplementary Note 2)
There is provided the information processing apparatus according to supplementary note 1, wherein the second controller uses, on the down-link from the base station to the IoT device, a route smaller in the number of relays than the route that uses the at least one relay utilized in the upload.

(Supplementary Note 3)
There is provided the information processing apparatus according to supplementary note 2, wherein the second controller performs direct transmission without using the at least one relay on the down-link from the base station to the IoT device.

(Supplementary Note 4)
There is provided the information processing apparatus according to any one of supplementary notes 1 to 3, further comprising a detector that detects a remaining battery level of the relay,
wherein the second controller determines a transmission route based on a remaining battery level of the at least one relay on the down-link from the base station to the IoT device.

(Supplementary Note 5)
There is provided the information processing apparatus according to supplementary note 4, wherein the second controller determines a transmission route by selecting, based on the remaining battery level of the at least one relay, whether to use all the at least one relay or decrease the number of relays on the down-link from the base station to the IoT device.

(Supplementary Note 6)
There is provided the information processing apparatus according to supplementary note 4, wherein the second controller selects, based on the remaining battery level of the at least one relay, whether to use all the at least one relay or perform direct transmission without using the relay on the down-link from the base station to the IoT device.

(Supplementary Note 7)
There is provided the information processing apparatus according to any one of supplementary notes 1 to 6, further comprising a detector that detects a QOS of the relay,
wherein the second controller determines a transmission route based on a QOS of the at least one relay on the down-link from the base station to the IoT device.

(Supplementary Note 8)
There is provided a communication method comprising:
performing multihop routing via at least one relay on an upload of data from an IoT device to a base station; and
using, on a down-link from the base station to the IoT device, a route different from a route that uses the at least one relay utilized in the upload.

(Supplementary Note 9)
There is provided a communication program for causing a computer to execute a method, comprising:
performing multihop routing via at least one relay on an upload of data from an IoT device to a base station; and
using, on a down-link from the base station to the IoT device, a route different from a route that uses the at least one relay utilized in the upload.

(Supplementary Note 10)
There is provided a communication system comprising:
an IoT device including a first controller that controls to perform multihop routing via at least one relay on an upload of data from the IoT device to a base station; and
a base station including a second controller that controls to use, on a down-link from the base station to the IoT device, a route different from a route that uses the at least one relay.

(Supplementary Note 11)
There is provided an IoT device comprising a controller that controls to perform multihop routing via at least one relay on an upload of data to a base station.

(Supplementary Note 12)
There is provided a base station comprising a second controller that controls to use, on a down-link to an IoT device, a route different from an up-link from the IoT device to the base station.

The invention claimed is:

1. An operator management system via a mobility management entity for controlling IoT devices and a base station in a network comprising:
   a first detector that detects a remaining battery level of each one of the IoT devices in the network;
   a second detector that detects a QOS of each one of the IoT devices in the network;
   an uplink controller that controls one of the IoT devices to perform multihop routing via at least two relays on an upload of data from the IoT device to a base station with uplink instructions, wherein the uplink instructions are transmitted from the operator management system via the mobility management entity to the one of the IoT device; and a downlink controller that selects at least one relay from among said at least two relays based on the remaining battery levels and the QOSs and controls the base station to use, on a down-link from the base station to the one of the IoT device, the selected relay except for relays with low remaining battery levels and relays with poor QOSs with downlink instructions, wherein the downlink instructions are transmitted from the operator management system via the mobility management entity to the base station.

2. A communication method for controlling IoT devices and a base station in a network comprising:

detecting a remaining battery level of each one of the IoT devices in the network;

detecting a QOS of each one of the IoT devices in the network;

performing multihop routing via at least two relays on an upload of data from one of the IoT devices to a base station, wherein uplink instructions are transmitted from an operator management system via a mobility management entity to the one of the IoT device;

selecting at least one relay from among said at least two relays based on the remaining battery levels and the QOSs; and using, on a down-link from the base station to the one of the IoT device, the selected relay except for relays with low remaining battery levels and relays with poor QOSs, wherein downlink instructions are transmitted from an operator management system via a mobility management entity to the base station.

3. A communication system comprising:

one or more IoT devices;

a base station;

a mobility management entity; and an operator management system, wherein the operator management system comprises:

a first detector that detects a remaining battery level of each one of the one or more IoT devices in a network, a second detector that detects a QOS of each one of the one or more IoT devices in the network, an uplink controller that controls one of the one or more IoT devices to perform multihop routing via at least two relays on an upload of data from the IoT device to the base station with uplink instructions, wherein the uplink instructions are transmitted from the operator management system via the mobility management entity to the one of the one or more IoT device; and a downlink controller that selects at least one relay from among said at least two relays based on the remaining battery levels and the QOSs and controls to use, on a down-link from said base station to said IoT device, the selected relay except for relays with low remaining battery levels and relays with poor QOSs with downlink instructions, wherein the downlink instructions are transmitted from the operator management system via the mobility management entity to the base station.

* * * * *